(No Model.)
H. F. SHELDON.
PROPELLING MECHANISM FOR VEHICLES.
No. 532,596. Patented Jan. 15, 1895.
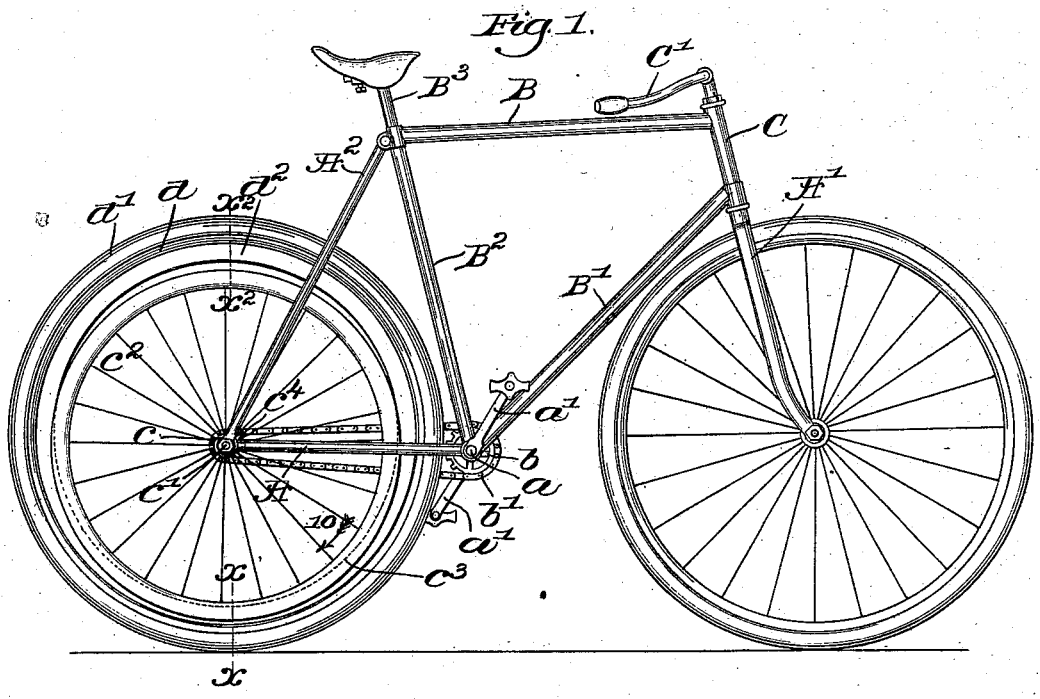
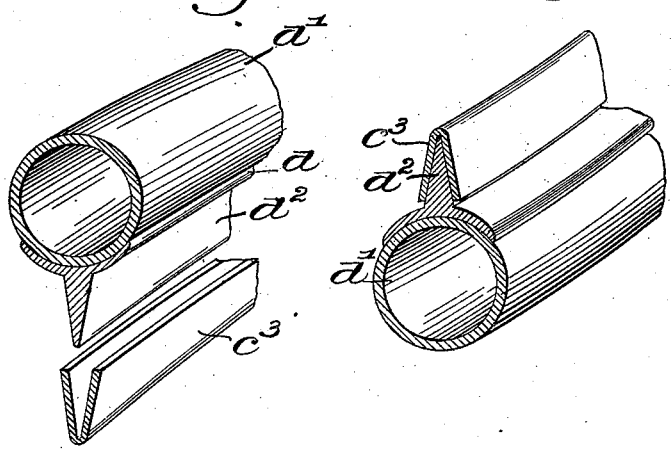
Witnesses
Louis N. Gowell
Thomas J. Drummond
Inventor
Herbert F. Sheldon
by Crosby & Gregory
attys.

UNITED STATES PATENT OFFICE.

HERBERT F. SHELDON, OF MELROSE, MASSACHUSETTS.

PROPELLING MECHANISM FOR VEHICLES.

SPECIFICATION forming part of Letters Patent No. 532,596, dated January 15, 1895.

Application filed February 2, 1894. Serial No. 498,847. (No model.)

*To all whom it may concern:*

Be it known that I, HERBERT F. SHELDON, of Melrose, county of Middlesex, State of Massachusetts, have invented an Improvement in Propelling Mechanism for Vehicles, of which the following description, in connection with the accompanying drawings, is a specification, like letters on the drawings representing like parts.

This invention has for its object the production of a novel propelling mechanism for vehicles, whereby the power exerted is applied in such manner that it is fully utilized in urging the vehicle forward.

My invention is particularly adapted for the propulsion of bicycles and similar vehicles, the weight of the rider being utilized in the transmission of power, the construction and arrangement of parts being very simple and compact.

In accordance therewith my invention consists in an annular tread, combined with a power transmitting wheel internally eccentric thereto, a flange on one and a groove formed in the other co-operating through an arc of more than one hundred and eighty degrees to maintain the tread in place, and means to rotate said wheel, whereby it rolls upon the inner circumference of and rotates said tread, and is retained in the same vertical plane by the co-operating parts, substantially as will be described.

Other features of my invention will be hereinafter described and particularly pointed out in the claims.

Figure 1 in side elevation represents a bicycle of the "safety" type, with my invention applied thereto. Fig. 2 is an enlarged vertical section taken on the line $x$, Fig. 1; and Fig. 3 is a similar view taken on the line $x^2$, Fig. 1.

I have herein shown my invention as applied to a "safety" bicycle, in which the frame, comprising the rear forks A, front forks A', backbone B, brace B', head C, and handle bar C', are and may be of any usual or well known construction. The rear ends of the backbone B and brace B' are rigidly connected by an upright $B^2$, adapted to receive therein the adjustable seat post $B^3$, the lower ends of the rear forks A and the junction of the said brace and upright being connected by braces $A^2$. A suitable bearing is formed at the junction of the brace and the upright, through which is extended a crank shaft $a$, provided with crank arms $a'$ for the usual pedals, and preferably a sprocket wheel $b$ is secured to the crank shaft $a$. Bearings, as $c$, are formed on the rear forks A' in usual manner, to receive the shaft $c'$ of a power transmitting wheel $c^2$, having a rim $c^3$, V-shaped in cross-section, as best shown in Figs. 2 and 3, and a sprocket wheel $c^4$ is secured to or forms a part of the hub of the wheel. The sprocket wheels $b$ and $c^4$ are connected by a link or other suitable belt $b'$, the speed of the power wheel being proportioned to that of the crank shaft according to the ratios of the two sprocket wheels.

In the place of the usual tire secured to the rim of the wheel $c^2$ I have provided a separate annular tread therefor, surrounding the rim $c^3$ loosely and eccentrically, the tread being of slightly greater diameter than the power wheel. This annular tread is preferably composed of a rim $d$ having a concave face to receive therein a tire $d'$ of any desired construction, and a wedge-shaped flange or web $d^2$ is secured to the inner circumference or forms a part of the rim $d$, as clearly shown in the drawings, said flange entering the V-shaped rim $c^3$ of the power wheel and retaining the annular tread in place thereupon.

As shown in Fig. 1, the annular tread rests upon the ground or other surface precisely as if it were secured to the wheel $c^2$, but owing to the eccentricity of the tread and its greater diameter it presents a species of rotating track upon the inner circumference of which the power transmitting wheel is adapted to roll for a greater or less distance when positively rotated.

Referring to Fig. 1, it will be seen that the wheel rim $c^3$ fits snugly upon the flange $d^2$ of the tread at a point directly below the centers of wheel and tread, as shown in Fig. 2, and the rim and flange are farthest apart at the diametrically opposite point, taking the position shown in Fig. 3. The said rim and the flange are of such dimensions that a sufficient portion of the latter is at all times inclosed by the former to support the tread and maintain it in the plane of the power wheel, and as shown in Fig. 1 the co-operating portions of the flange and the grooved rim always extend over an arc of more than one hundred and eighty degrees, the chord of said arc always passing through a point above the center of the wheel.

Supposing the parts to be in the position shown in Fig. 1, if power be applied to the wheel $c^2$ to rotate it in the direction of the arrow 10 it will tend to roll forward and upward on the inner circumference of the tread, the amount depending upon the power exerted and the resistance to be overcome, such movement tending to raise the rider and the rear end of the frame. The center of the power wheel is moved ahead of the center of the annular tread, and the weight of the rider and frame is applied at the point of the tread intersected by a perpendicular passing through the wheel center, tending to press that part of the tread toward the ground. As the power wheel is rotated and the tread is thereby moved forward the transfer of the point of application of the rider's weight is continuous, maintaining the rotation of the tread and carrying the machine along.

It will be readily understood that the greater the distance the power wheel rolls upon the inner circumference of the tread the greater will be the separation of the perpendiculars passing through the centers of the wheel and tread respectively, resulting in a greater leverage exerted by the rider's weight upon the tread.

In the various forms of bicycles now known to me, the weight of the rider is transmitted in the perpendicular extended through the wheel center and the lowest point of its rim, and propulsive force is applied to the wheel near its center, whereas in my invention as herein described the weight is continually carried forward of and above the lowest point of the rim, and the propulsive force is applied to the annular tread, corresponding to an application to the wheel rim instead of near its center.

By my herein described construction the power wheel may be geared up to a very high ratio, and operated without a greater expenditure of power than would be required with a much lower ratio in driving mechanism of usual construction, resulting in an increase of speed without increase of power.

My invention is not restricted to the exact proportions shown, nor to the particular shape and arrangement of details, as the same may be modified without departing from the spirit of my invention.

I am aware that a small power transmitting wheel has been arranged to rest and roll upon the inside of a circular track many times larger than said transmitting wheel, various forms of guides supported on a framework bearing against the track at various points to maintain it upright, the frame, which is also the supporting frame for the transmitting wheel, having guide wheels secured thereto and resting on the ground, and such constructions I do not claim, but so far as I am aware, I am the first to wholly guide and support in upright position an annular tread by power transmitting wheel of only slightly less diameter.

I claim—

1. An annular tread, combined with a power transmitting wheel internally eccentric thereto, a flange on one and a groove formed in the other co-operating throughout an arc of more than one hundred and eighty degrees, to maintain the tread in place, and means to rotate said wheel, whereby it rolls upon the inner circumference of and rotates said tread, and is retained in the same vertical plane by the co-operating parts, substantially as described.

2. In a bicycle, an external frame, a crank shaft carried thereby, and a peripherally grooved power transmitting wheel supported by the frame, and connections between said shaft and wheel, combined with an annular tread surrounding an eccentric to said wheel, the said tread entering a portion of the grooved periphery of said wheel and being overlapped by the sides thereof throughout an arc of more than one hundred and eighty degrees, and supported in upright position thereby substantially as described.

In testimony whereof I have signed my name to this specification in the presence of two subscribing witnesses.

HERBERT F. SHELDON.

Witnesses:
FREDERICK L. EMERY,
THOMAS J. DRUMMOND.